(No Model.)

H. BARNEY.
VEHICLE AXLE BEARING.

No. 423,717. Patented Mar. 18, 1890.

Witnesses
G. S. Elliott
E. W. Johnson

Henry Barney.
Inventor
by
Attorney

UNITED STATES PATENT OFFICE.

HENRY BARNEY, OF HILLSBOROUGH, WISCONSIN, ASSIGNOR TO THE ROLLER BEARING AXLE COMPANY, OF SAME PLACE.

VEHICLE-AXLE BEARING.

SPECIFICATION forming part of Letters Patent No. 423,717, dated March 18, 1890.

Application filed January 18, 1890. Serial No. 337,301. (No model.)

*To all whom it may concern:*

Be it known that I, HENRY BARNEY, a citizen of the United States of America, residing at Hillsborough, in the county of Vernon and State of Wisconsin, have invented certain new and useful Improvements in Vehicle-Axle Bearings; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in devices for reducing friction between spindles and the end or collar bearings thereof, whether applied to vehicle-axles, journal-bearings, or other analogous devices.

The object of the invention is to provide means for taking up the end or lateral thrust, as will be hereinafter fully set forth, and particularly pointed out in the claims.

Figure 1:
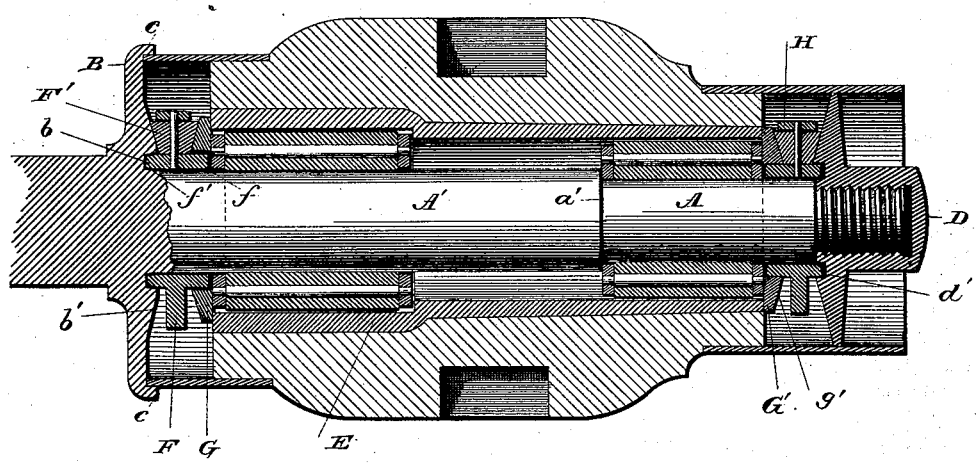
Figure 2:
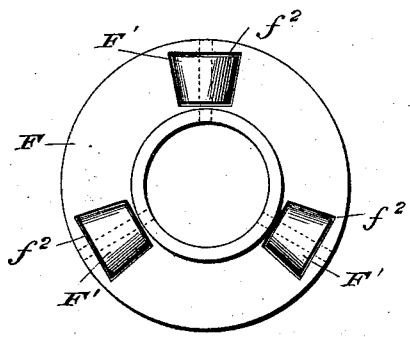
Figure 3:
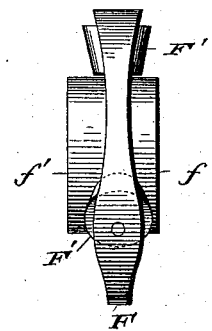
Figure 4:

In the accompanying drawings, Figure 1 is a longitudinal sectional view showing my improvement applied to an axle-spindle and hub or box. Fig. 2 is a plan view of one of the anti-friction devices, which is placed at either end of the spindle. Fig. 3 is a sectional view thereof. Fig. 4 is a side view of one of the washers.

Referring to the drawings, the spindle may be made of two parts A and A', between which is a shoulder $a'$. This spindle has formed integral therewith or attached thereto at the inner end of the portion A' a flange B, the outer face of which may be of any ordinary construction, while the portion adjacent to the spindle A' has a recess $b$, and from the outer edge of this recess the inner face of the flange B is beveled or inclined, as shown at $b'$. The periphery of this flange extends inwardly, as shown at $c$, and within the outer edge of this inwardly-extending portion the hub-band is adapted to lie. At the outer end of the spindle a flanged retaining-nut D is secured, and the inner face of the flange on this nut is oppositely beveled or inclined from the bevel on the flange B. The skein E, which is secured in the hub or box in the usual manner, is provided interiorly with portions of different diameters, within which are placed, and over the spindle, anti-friction rollers, which are loosely mounted on rods attached to end plates, as shown in a prior patent, dated October 25, 1887, which is numbered 371,991. Over the inner end of the spindle is placed a roller-carrying frame F, which has a central opening of a size to fit snugly upon the portion A' of the spindle, and flanges $f$ and $f'$ are formed on this roller-carrying frame, the projecting flange $f'$ being adapted to lie in the recess $b'$, formed in the flange B adjacent to the spindle, while the opposite flange $f$ is of a greater diameter or thickness and has placed over the same a washer G, which will be hereinafter referred to. The roller-carrying frame F has formed therein three or more openings $f^2$, which are intersected by pins, upon which are journaled conical rollers F', which bear between the inclined faces of the flange B and washer G. At three or more equidistant points the roller-carrying frame is thickened, while the intermediate portions are cut away for the purpose of lightening the frame. The end of the frame carrying the horizontal rollers abuts against the straight edge of the washer G, and they rotate together when the parts are properly organized. The diameter of the roller-carrying frame F is less than the inner portion of the inclined face $b'$ of the flange B, so that a space is provided in which the inner end of the rear hub-band will lie. The inner end of the skein will abut against the straight face of the washer G when the parts are organized, so that the larger horizontal roller-carrying frame has a lateral play upon the portion A' of the spindle and within the axle-box. On the opposite or outer end of the spindle is placed first a washer G', which has a beveled or inclined face $g'$ and a central opening of sufficient size to permit the inner flange of the conical roller-carrying frame H to lie within said opening, so that the tapered rolllers carried by said frame will move upon the inclined face of the washer. The opposite side of said frame has a larger flange, which lies in the recess $d'$, formed adjacent to the inner face of the nut or inner face of shoulder, or axle, or shaft, or side of car, or on engine-wheel next to box-bearing. By this construction all end-thrust is taken up and the larger part of the friction. The outer hub-band is adapted to lie over the outer periphery of the flanged nut.

This device is not only adapted to be applied to vehicle spindles and hubs, but also to car-axles, journal-bearings, or upon any such devices in which there would be an end-thrust.

In the prior patent hereinbefore referred to the roller-carrying frames which support the conical rollers are made up of either one or more rings, which are held together by pins or journals, upon which the conical rollers revolve. This construction in practice has certain objectionable features—to wit, when a single inner ring is used there is not sufficient support for the journals of the conical rollers, and when an inner and outer ring are used the journals have to serve double duty—to connect the rings and provide bearings for the rollers. These objectionable features are overcome by forming the conical journal-supports of one piece and reducing the thickness of the portions between the bearings, so as to insure lightness, while the inner flanges maintain the roller-supports in proper position.

I am aware that bearings for vertical shafts have been provided with inner and outer frames, between which are located conical rollers, said rollers being adapted to contact with inclined faces formed upon the shaft or attached thereto, and also upon a correspondingly-inclined plate forming a portion of the shaft-hanger, and I do not claim such as my invention; but What I do claim as new, and desire to secure by Letters Patent, is—

1. The combination, with a spindle constructed substantially as shown and provided with a flange B, having an inclined face and a groove or recess $b$, of a roller-carrying frame made of a single piece and provided with openings in which are placed conical rollers, said frame having on one side a flange adapted to enter the recess $b$, a similar flange on the opposite side, and a washer G, having an inclined face, against which the rollers abut, substantially as shown, and for the purpose set forth.

2. The combination, with a spindle constructed substantially as shown, of a nut D, having a flange with an inner inclined face formed thereon, a groove or recess adjacent to the inclined face of the flange, and a roller-carrying frame made of a single piece or casting with laterally-extending flanges adjacent to the central opening therein, and a washer having an inclined face, substantially as set forth.

3. In combination with a spindle constructed substantially as shown and provided centrally with frames carrying longitudinal rollers, said spindle having at one end a flange B, the inner face of which is beveled, and at the opposite end a nut D, with an inclined inner face, frames F and G, carrying conical rollers adapted to abut against the inclined faces of the flange and nut, and washers provided with inclined faces on one side and straight faces on the other side, the parts being organized substantially as shown, and for the purpose set forth.

4. In combination with a spindle provided with frames carrying longitudinal rollers, said spindle having at one end a flange the inner face of which is beveled and at the opposite end a nut with an inclined inner face, said nut having a projecting portion with a correspondingly-inclined edge, and conical rollers mounted in frames and adapted to contact with the inclined faces of the flange and nut, for the purpose set forth.

In testimony whereof I affix my signature in presence of two witnesses.

HENRY BARNEY.

Witnesses:
 CARL ALGERTER,
 ROBT. LIND.